United States Patent [19]
Chen et al.

[11] Patent Number: 5,907,671
[45] Date of Patent: May 25, 1999

[54] FAULT TOLERANT SYSTEM BASED ON VOTING

[75] Inventors: Chin-Long Chen, Fishkill, N.Y.; Canh Xuan Le, Westborough, Mass.; Tin-Chee Lo, Fishkill, N.Y.; Arnold Weinberger, Scottsdale, Ariz.

[73] Assignee: International Business Machines Corporation, Armonk, N.Y.

[21] Appl. No.: 08/700,343

[22] Filed: Sep. 23, 1996

[51] Int. Cl.$^6$ ..................................................... G06F 11/00
[52] U.S. Cl. .................................. 395/182.04; 371/37.7; 371/49.1
[58] Field of Search .................. 395/182.04, 182.03; 371/37.7, 37.9, 41, 40.2, 40.4, 40.12, 36, 49.1, 49.2, 50.1, 51.1, 54, 37.6

[56] References Cited

U.S. PATENT DOCUMENTS

| | | | |
|---|---|---|---|
| 3,896,416 | 7/1975 | Barrett et al. | 371/41 |
| 4,464,754 | 8/1984 | Stewart et al. | 371/51.1 |
| 4,464,755 | 8/1984 | Stewart et al. | 371/51.1 |
| 4,670,880 | 6/1987 | Jitsukawa et al. | 371/36 |
| 4,873,685 | 10/1989 | Millis, Jr. | 371/36 |
| 5,056,095 | 10/1991 | Horiguchi et al. | 371/40.3 |
| 5,067,132 | 11/1991 | Blakkan | 371/52 |
| 5,267,250 | 11/1993 | Uehara | 371/57.1 |

OTHER PUBLICATIONS

Abdelnour et al., "Dual Redundancy with Checking", IBM Technical Disclosure Bulletin, vol. 34, No. 5, Oct., 1991, pp. 163–165.

Dishon, "Highly Reliable Computer Memory Circuit with Battery Backup" IBM Technical Disclosure Bulletin, Vo. 33, No. 11, Apr., 1991, pp. 323–327.

Norgaard, "Nonvolatile RAM Failure Rate Reduction Through the Use of Redundancy", IBM Technical Disclosure Bulletin, vol. 31, No. 10, Mar., 1989, pp. 61–63.

Ho et al., "Adaptive Majority Logic", IBM Technical Disclosure Bulletin, vol. 13, No. 10, Mar. 1971, pp. 2830–2831.

Takayesu et al., "Paired Error Correcting Scheme", IBM Technical Disclosure Bulletin, vol. 13, No. 7, Dec., 1970, pp. 1983–1984.

Eggenberger, "A Class of Error–Correcting Codes with Simple Encoders and Decoders", IBM Technical Disclosure Bulletin, vol. 9, No. 11, Apr., 1967, pp. 1607–1612.

*Primary Examiner*—Dieu-Minh T. Le
*Attorney, Agent, or Firm*—Lawrence D. Cutter

[57] ABSTRACT

A fault tolerant circuit having improved error correction and detection properties takes advantage of two distinct forms of information redundancy: modular redundancy and parity check bit redundancy, in a cooperative fashion. In particular, it is shown that simple majority voting logic circuits, when employed in the subject environment, provide an easily realized mechanism for error correction and error detection. This results in an extremely fault tolerant information system.

9 Claims, 4 Drawing Sheets

FAULT TOLERANT SYSTEM BASED ON VOTING

BACKGROUND OF THE INVENTION

The present invention is generally directed to the utilization of redundant information sources which include a parity bit. More particularly, the present invention is directed to redundant computer memory systems which include a parity bit. Advantage is taken of the presence of the parity bit in a redundant environment to construct an extremely fault tolerant memory or information system. In particular, it is shown that simple majority voting logic circuits, when employed in this environment, provide an easily realized mechanism for error correction and error detection.

In the design of memory chips and memory systems, it is sometimes the case that not all memory array regions are required for a particular system application. In such circumstances, portions of the resulting memory array structure become available for other purposes. In particular, one of these other purposes is for providing redundant sources of information. Thus, when it is found in a particular memory array system that a portion of the array is not needed for the storage of required data, it is possible to devote other regions or array portions of the chip to the storage of redundant information. That is, the same information is stored in the multiple array portions. In those situations where one is able to store an odd number of redundant pieces of information, it is possible to provide a simple voting circuit for each bit of information. In such voting circuits, the output bit is a zero or a one depending upon whether the majority of input binary signals is a zero or one. In fact, in computer systems where fault tolerance is critical, it is known to employ multiple processors or memory systems carrying out the same operations and wherein the result is determined by majority logic voting.

In such redundant systems, it is possible that simple single bit parity information may also exist within the individual redundant units. However, such parity information is usually treated simply as another bit in the redundant set of bits.

Accordingly, it is desirable to provide a mechanism which integrates the fault tolerant coverage provided by redundant copies with the fault protection provided by parity checking. In other words, it is desirable to be able to provide a cooperative relationship between simple redundancy and parity in a manner so as to provide the highest possible level of error detection and error correction.

It is noted that, while the description provided herein is primarily directed to a memory system, the principles and circuitry are equally applicable to fault tolerance when an arbitrary plurality of binary signal sources is employed. Thus in the present invention the signal sources are typically memory array structures containing redundant information; however, the present invention is in fact not so limited, but may extend to information sources other than semiconductor computer system memories.

SUMMARY OF THE INVENTION

In accordance with a preferred embodiment of the present invention, a fault tolerant error correction circuit comprises a plurality of binary signal sources each having b bits of information per source and wherein at least one of these b bits represents a parity check bit. For each information source, parity signal generating means are provided. The parity signal generating (PSG) means produces the modulo-2 sum of all but one of the b bits from a single information source. (In the case that an odd parity bit is employed, this modulo-2 sum is inverted.) It is noted that there is at least one bit which is not present in this modulo 2 summation. Thus for each bit in each source a second bit signal is created. If there are N binary signal sources, then 2N binary bit signals are produced, one representing the $i^{th}$ bit itself the other representing the output of a parity signal generator (as that term is employed herein). In accordance with the present invention, these 2N bits are supplied to a majority vote logic block whose output is reflective of the majority of input signals. In the event of a tie, an uncorrectable error signal for that particular bit is generated.

In the present invention, the parity signal generator may be implemented in at least two different ways. In one implementation, all of the b bits in each information source save one of the b bits is supplied to an Exclusive-OR circuit. In another implementation, all of the b bits are supplied to a single parity check generator which operates on all b bits and whose output is Exclusive-ORed with the $i^{th}$ bit. In either case the result is the same.

Accordingly, it is an object of the present invention to increase fault tolerance in computer memory and information systems.

It is also an object of the present invention to employ circuits in which redundant information and parity check information are used in a cooperative fashion to enhance fault tolerance and reliability.

It is a still further object of the present invention to provide a mechanism for utilization of spare memory resources which occur in certain memory design situations.

It is still another object of the present invention to optimize the utilization of triply modular redundant circuits.

It is a still further object of the present invention to increase the capabilities of error detection and error correction in memory systems.

Lastly, but not limited hereto, it is an object of the present invention to provide a mechanism for the indication that an error or set of errors is uncorrectable.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
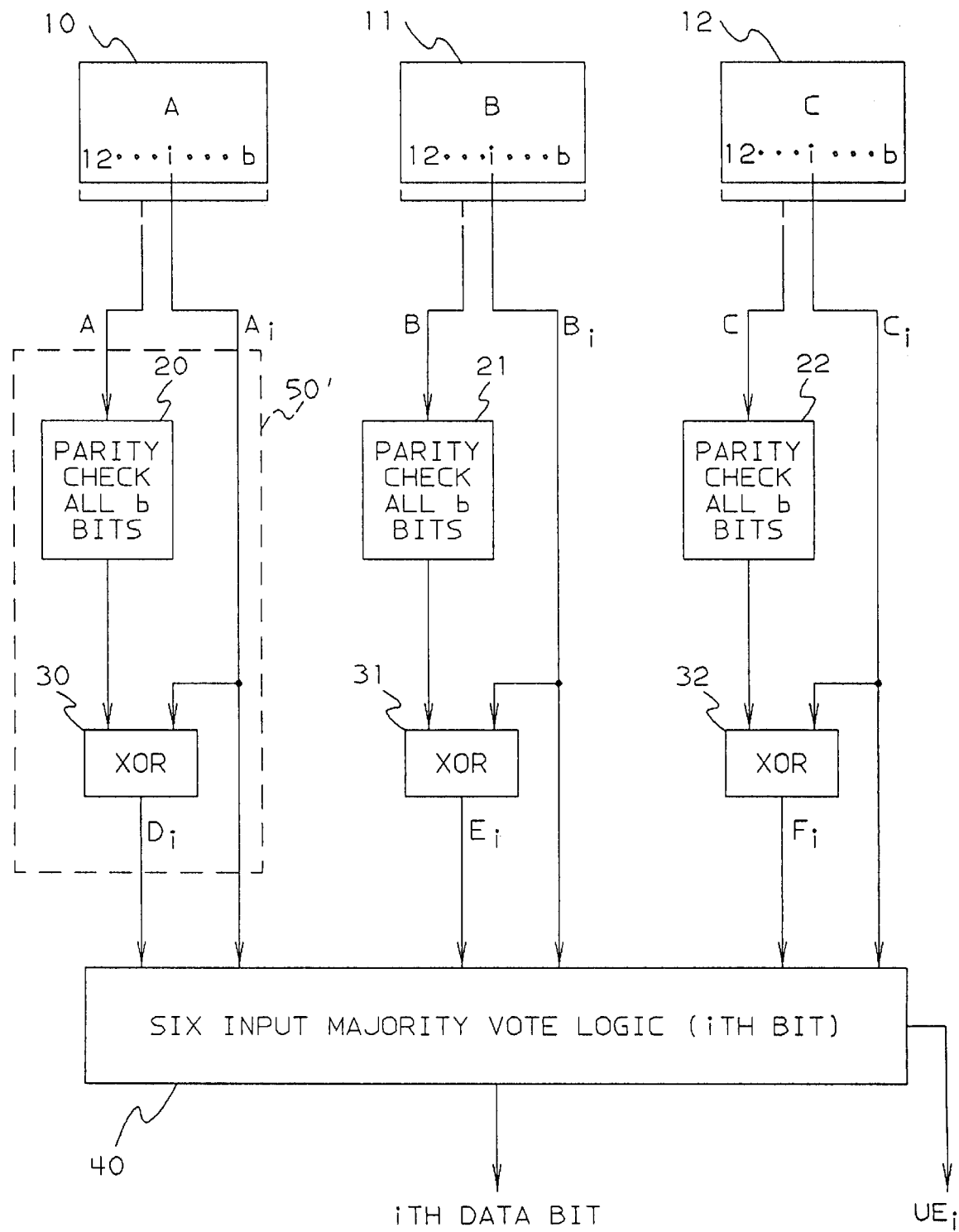
FIG. 1 is a block diagram illustrating one embodiment of the present invention which is employed in the generation of the $i^{th}$ data output bit in a triply modular redundant situation.

FIG. 1 illustrates one embodiment of the present invention for the situation in which triply modular redundant information sources are present. In particular, it is seen that information sources A, B and C (reference numerals 10, 11 and 12, respectively) typically comprise memory arrays or portions of memory arrays as might be found on a circuit chip. In general, there is a plurality N of such memory sources or memory array elements. Each of these sources typically supplies b bits of information (labelled as 1 2 . . . i . . . b in FIG. 1). Thus there are N redundant sets of information sources each supplying b bits of information. In particular, FIG. 1 illustrates the circuit employed in the present invention for determining the $i^{th}$ data output bit. Each of the information sources A, B and C supply the $i^{th}$ bit ($A_i$, $B_i$ and $C_i$) to a six input majority vote logic circuit 40. In general, majority voting circuit 40 has 2N input signals. In the case shown, N=3 and single original bit signal lines $A_i$, $B_i$ and $C_i$ are supplied directly to majority voting logic circuit 40. Additionally, for each signal line $A_i$, $B_i$ and $C_i$ supplied to logic block 40, there is also supplied thereto a second signal line $D_i$, $E_i$ and $F_i$ respectively. More particularly, the signal line $D_i$ is associated with the $i^{th}$ bit of information source 10, namely $A_i$. Likewise, $E_i$ is associated with $B_i$ and $F_i$ with $C_i$.

In accordance with one embodiment, the signal $D_i$ is generated in the following fashion. In particular, all b bits from information source A are supplied to parity check circuit 20 which forms the modulo 2 summation of all b bits. This is convenient since this signal can then also be supplied to each of the b separate circuits for each of the b output signals. Parity check generator 20 typically comprises an array of Exclusive-OR gates and it is accordingly noted that modulo 2 summation and the logic operation of Exclusive-OR represent the same operation on binary signals. The output from parity check generator 20 is supplied to Exclusive-OR gate 30 which also receives the $i^{th}$ output bit signal $A_i$ from binary information source 10. The output of Exclusive-OR gate 30 is the desired signal $D_i$.

In a similar fashion, parity check generator 21 operates on all b bits of information source 11 and supplies its single output bit to Exclusive-OR gate 31 which also receives the $i^{th}$ bit signal from information source 11 which is supplied to Exclusive-OR gate 31 to produce signal $E_i$. In an identical fashion parity check generator 22 and Exclusive-OR gate 32 operate on the b signals from information source 12 to produce signal $F_i$ which is also likewise supplied to majority voting logic block 40 along with signals $E_i$ and $D_i$ above.

The above circuitry is repeated for each of the b bits, although it is noted that parity checkers 20, 21 and 22 need only be implemented once for each output bit. Thus, there are preferably N parity checkers 20, 21, 22 not Nb of them. This is more particularly illustrated in FIG. 4. Logic block 40 operates to produce an output signal of "1" if most of the inputs are binary "1" signals and to produce an output of binary "0" if most of the inputs are binary 0's. If an equal number of binary 0's and 1's are present at the input to block 40, an uncorrectable error signal $UE_i$ is generated. This indicates that an uncorrectable error has been found in the $i^{th}$ bit.

Figure 2:
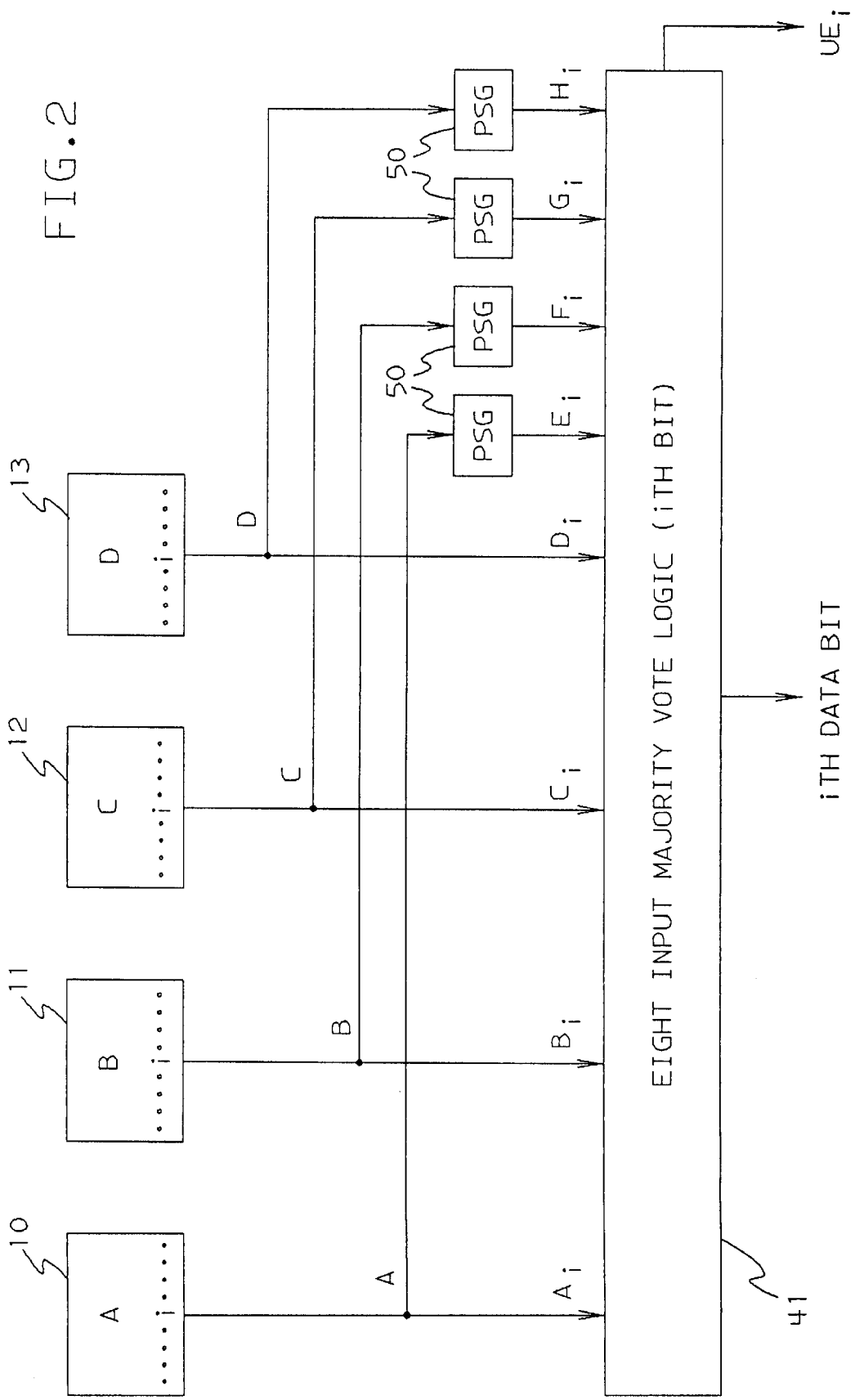
FIG. 2 is a block diagram illustrating the extension of the concept shown in FIG. 1 to a quadruply modular redundant situation and more particularly illustrating the more generic employment of a parity signal generator in accordance with the present invention.
Figure 3:
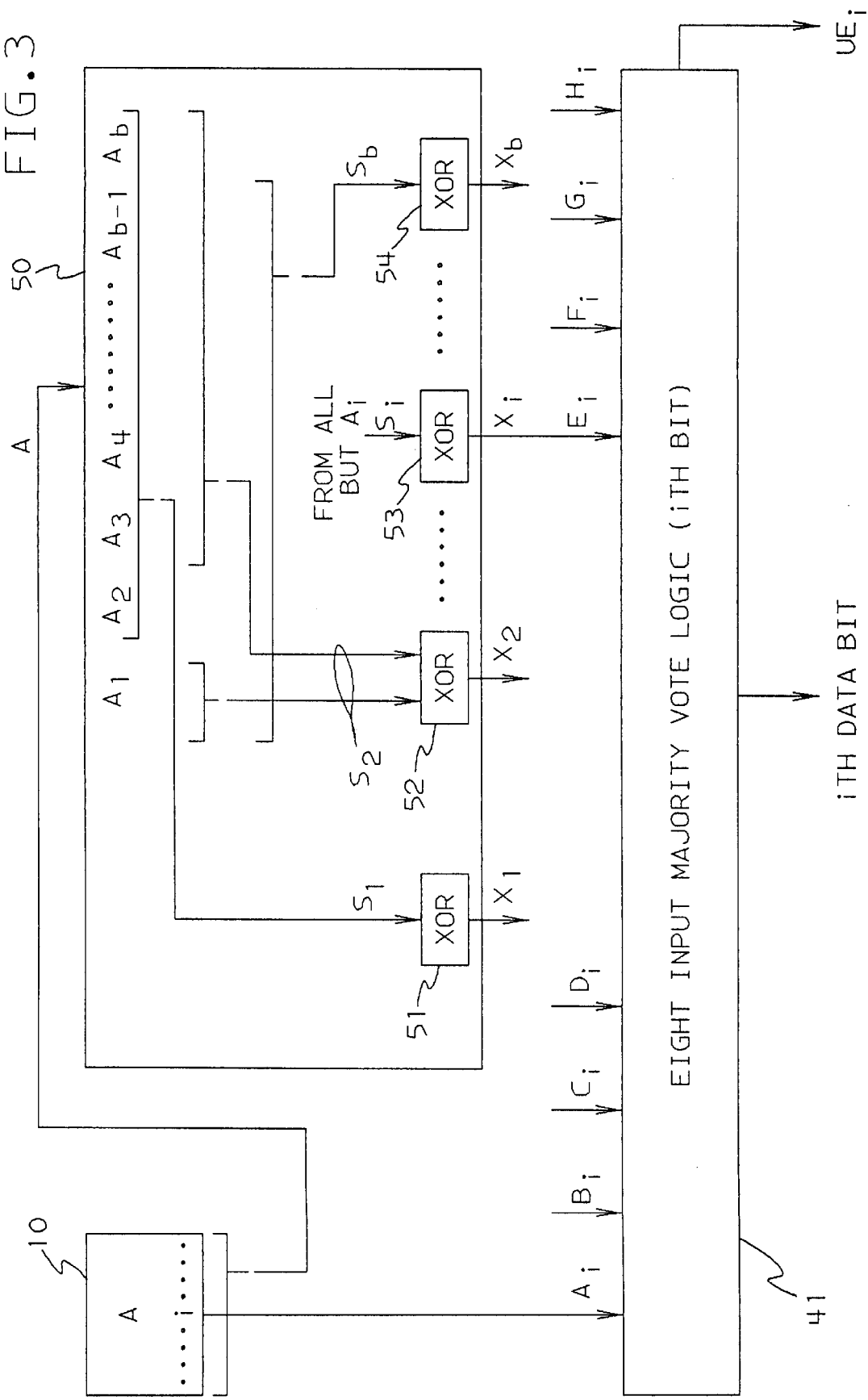
FIG. 3 is a block diagram similar to FIG. 2 but more particularly illustrating one embodiment for a parity signal generator, another embodiment having been previously illustrated in FIG. 1.

FIG. 2 illustrates, in block diagram form, that the present invention is extendable to quadruple modularly redundant circuits. FIG. 2 also illustrates an alternate embodiment for the generation of derived information signals $E_i$, $F_i$, $G_i$ and $H_i$ by parity signal generators. In particular, in FIG. 2 information sources A, B, C and D (reference numerals 10, 11, 12 and 13, respectively) are seen to supply their $i^{th}$ bits to an eight input majority voting logic block 41. Also, as a result of the presence of at least one parity bit in each of the information sources 10 through 13, it is possible to generate signals $E_i$, $F_i$, $G_i$ and $H_i$. FIG. 2 also illustrates that each of the N information sources also supplies their b binary signals to parity signal generator 50 which produces an additional N input signals to majority voting block 41. In particular, in addition to supplying each of the N bits (here N=4) bits $A_i$, $B_i$, $C_i$ and $D_i$ to block 41, there is also supplied to block 41 a single bit output signal from each of parity signal generators 50. These latter signals are designated $E_i$, $F_i$, $G_i$ and $H_i$ respectively. (Here note that the signal line $D_i$ does not carry the same meaning as the signal line $D_i$ shown in FIG. 1.) Parity signal generators 50 may comprise a circuit such as circuit 50' shown in the dotted line in FIG. 1 or may in fact be implemented as shown in the circuit of FIG. 3 discussed below. The importance of FIG. 2 is that it illustrates the natural extension of the present invention from a situation in which N=3 to a situation in which N=4. The extension to larger values of N is obvious as is the case of employing the present invention in the situation where N=2. The larger the value of N, the greater the degree of fault tolerance. FIG. 2 also illustrates the role and the presence of parity signal generator 50 which for each bit in the information source supplies an output bit, based on parity information, to the majority voting logic block 41. The output of parity signal generator 50 is not a parity signal per se but rather is a signal which is based upon parity and is accordingly, referred to herein as a parity signal generator rather than as a parity generator. And again, as in FIG. 1 majority voting logic block 41 operates in much the same manner, the only difference being the number of input signals and the actual decision point representing a majority (5 in block 41 of FIG. 2 and 4 in block 40 of FIG. 1).

FIG. 3 provides a more detailed description of one embodiment of a parity signal generator 50. In particular, it is seen that bits $A_1$, $A_2$, . . . , $A_b$ are supplied to circuit 50. Circuit 50 includes b distinct modulo 2 summers 51, 52, 53 and 54 etc. shown in FIG. 3. In particular, summer 51, shown as an Exclusive-OR gate (which is its equivalent), forms the modulo-2 summation from the set of signal lines $S_1$ which comprise all of the b bits from source 10 except bit 1. In particular, FIG. 3 illustrates the case for even parity. In the event that an odd parity bit scheme is employed, the modulo-2 sums are inverted. Similarly, summer 52 has as inputs signals from set $S_2$ which includes all of the b signals from source 10 except bit 2. Likewise, signal set $S_i$ includes all b signals from source 10 except bit i. In this manner, from summers 51, 52, 53 and 54 signals $X_1$, $X_2$, $X_i$ and $X_b$ are produced. In this particular case, signal $X_i$ is the same as signal $E_i$ as shown in FIG. 2. Signal $E_i$ and $A_i$ are two of the signals supplied from the circuitry shown here to logic block 41. The other signals shown come in a very closely analogous manner from information sources B, C and D. Again as above, signal $B_i$ is associated with signal line $F_i$, $C_i$ with $G_i$ and $D_i$ with $H_i$ as in FIG. 2. And also as in FIG. 2, the output is based upon the majority voting in logic block 41.

Figure 4:
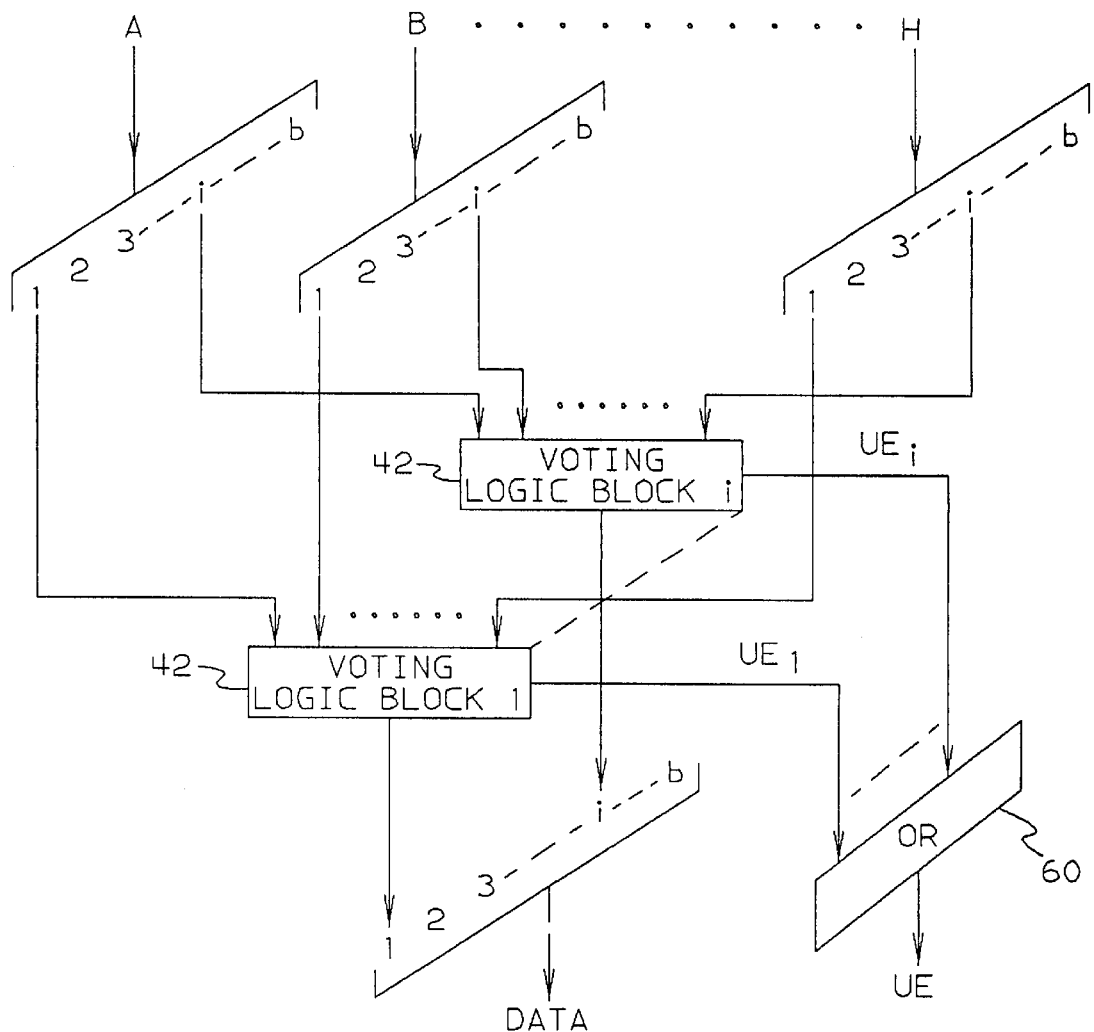
FIG. 4 is a overall block diagram illustrating the output signal portion of a circuit in accordance with the present invention and particularly illustrating voting logic block 1 through voting logic block i.
Figure 5:
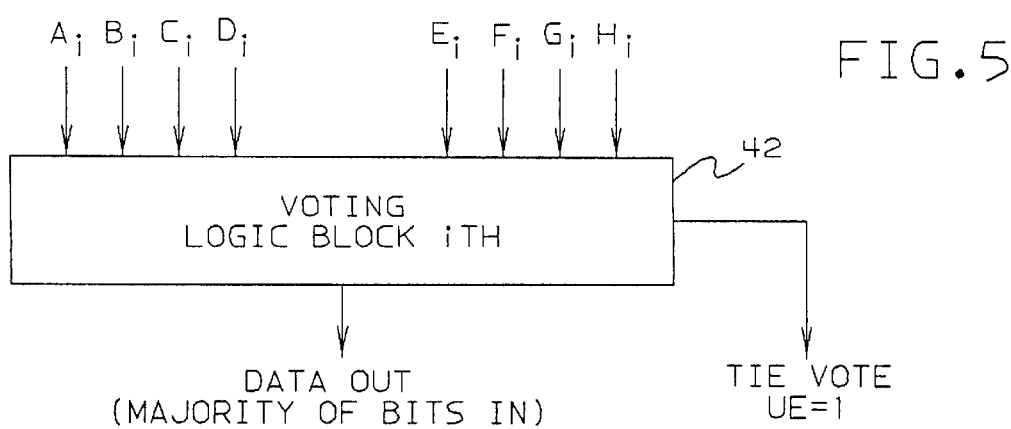
FIG. 5 is a functional block diagram illustrating the operation of the $i^{th}$ voting block for a quadruply modular redundant situation.

FIG. 4 provides an overall view of the output portion of the present invention. In particular, FIG. 4 is drawn for the case in which N=4. Thus information sources A, B, C and D each with b bits and including one parity bit are supplied to the respective voting logic blocks 42, as shown. Similarly (albeit implicitly), parity signal generator output signals derived from sources A, B, C and D are supplied and are designated as sources E, F, G and H respectively. In this respect then, it is seen that FIG. 4 is similar to FIG. 3 in terms of the value of N (here 4). It is also noted that each of voting logic blocks 42 are preferably capable of producing an uncorrectable error signal, $UE_i$, when the number of "0" inputs supplied to the logic block is equal to the number of "1" inputs supplied to the logic block. These uncorrectable error signals are supplied to OR-gate means 60 which provides an overall uncorrectable error indication signal when any of the voting logic blocks have an equal number of "1" and "0" input signals.

Attention is now specifically directed to the error correction and detection properties associated with the fault tolerant system of the present invention. In particular, for the sake of example, the situation in which N=3 is considered. In such circumstances, one finds the presence of three redundant information sources, A, B and C. If there are no errors present in sources B and C, then any number of errors may be present in source A with a result that such error conditions are in fact corrected. Additionally, if there are no errors in source C, an odd number of errors in both sources A and B, then correction is also possible, and in fact occurs automatically in the present system. Likewise, if there are no errors in source C, an odd number of errors in source B and any number of errors in source A, then this error condition can in fact be detected and in fact will be flagged as an uncorrectable error. Similarly, if sources A, B and C all experience an odd number of errors, then error detection is likewise provided. This capability is summarized in the table below:

TABLE 1

ERROR CORRECTION/DETECTION COVERAGE

|  | A | B | C |
|---|---|---|---|
| Correction | Any | No | No |
|  | Odd | Odd | No |
| Detection | Even | Odd | No |
|  | Odd | Odd | Odd |

It should also be appreciated from symmetry conditions above that row 1 of the table is readily interpreted as implying that as long as any two of the sources experience no errors there may be any number of errors in the other source without effecting the correctness of the output. Similar statements are clear from the other three rows. In particular, it is also noted that labels A, B and C in the table above are readily permutable without changing the error correction or detection properties of the fault tolerant system.

In the determination of the capabilities of the present system, it is noted that an odd number of errors in one information source will result in a discrepancy in the pair of signals that are fed into a majority vote logic. Thus, the pair of signals will not affect the output of any majority vote logic block. On the other hand, an even number of errors will introduce two erroneous votes in at least one majority vote logic block. They will be detected if thee is no error in another information source as shown in the third row of Table 1.

From the above, it should be appreciated that the system of the present invention cooperatively integrates two normally disparate methods which provide information redundancy. In particular, the present invention provides an interactive cooperation between modular redundancy and the utilization of parity bit signals to generate an appropriate set of input signals to a majority vote logic block which thereby produces output signals have enhanced error correction and detection properties. Moreover, the present invention is readily implemented using, for each information source, a single parity check tree.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A fault tolerant error correction circuit comprising:

a plurality N of binary signal sources having b bits per source and wherein at least one of said b bits in each source is a parity check bit;

parity signal generating means for generating, for each of said of N sources and for each of said b bits, a binary output signal which is the modulo-2 sum, or the inverted modulo-2 sum, of all but one of said b bits from a single one of said N sources, wherein for each of said N sources, a different one of said b bits is absent from said modulo-2 sum; and majority logic voting means for each of said b bits, each of said majority logic voting means having N input signal lines from each one of said N sources, said N inputs from said sources corresponding to respective ones of said b bits, said majority logic voting means also having an additional N input signal lines from the output of each one of said N parity signal generating means, said additional N input signal lines from said parity signal generating means corresponding to respective ones of said b bits.

2. The circuit of claim 1 in which said plurality of N sources represent redundant information.

3. The circuit of claim 1 in which said signal sources comprise memory arrays or portions thereof.

4. The circuit of claim 1 further including means for indicating the presence of an uncorrectable error.

5. The circuit of claim 4 in which said uncorrectable error indicating means provides an indication that for at least one of said b bits the majority logic voting means has received the same number of 0 and 1 input signal indications.

6. A fault tolerant error correction circuit comprising:

a plurality N of binary signal sources wherein at least one such source has b bits and wherein said b bits includes at least one parity check bit;

parity check means, for at least one of said b bit sources, for forming the modulo-2 sum of said b bits to produce a single bit parity check output signal;

summing means for forming the modulo-2 sum of said single bit parity check output signal and one of said b bits to produce a single bit voting signal;

majority voting logic means receiving said single bit voting signal and corresponding signals from said b bit binary signal sources.

7. The circuit of claim 6 in which said plurality of N sources represent redundant information.

8. The circuit of claim 6 in which said signal sources comprise memory arrays or portions thereof.

9. The circuit of claim 6 further including means for indicating the presence of an uncorrectable error.

* * * * *